(12) United States Patent
Cyman, Jr. et al.

(10) Patent No.: US 9,514,432 B2
(45) Date of Patent: Dec. 6, 2016

(54) APPARATUS AND METHOD FOR MONITORING A PACKAGE DURING TRANSIT

(71) Applicant: R.R. DONNELLEY & SONS COMPANY, Chicago, IL (US)

(72) Inventors: Theodore F. Cyman, Jr., Grand Island, NY (US); Alan R. Murzynowski, Grand Island, NY (US); Daniel E. Kanfoush, Grand Island, NY (US); James L. Warmus, LaGrange, IL (US); Eric V. Palmer, Lancaster, NY (US)

(73) Assignee: R.R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 14/830,452

(22) Filed: Aug. 19, 2015

(65) Prior Publication Data

US 2016/0055453 A1 Feb. 25, 2016

Related U.S. Application Data

(60) Provisional application No. 62/039,237, filed on Aug. 19, 2014.

(51) Int. Cl.
*G06Q 10/08* (2012.01)
*G06K 19/07* (2006.01)

(52) U.S. Cl.
CPC ....... *G06Q 10/0833* (2013.01); *G06K 19/0716* (2013.01); *G06Q 10/08* (2013.01)

(58) Field of Classification Search
CPC ................... G06K 19/07016; G06Q 10/0833; G06Q 10/08

USPC ...................................................... 340/572.1
See application file for complete search history.

(56) References Cited

U.S. PATENT DOCUMENTS

| | | | |
|---|---|---|---|
| 7,174,277 | B2 | 2/2007 | Vock et al. |
| 7,586,412 | B2 | 9/2009 | Takatama |
| 7,627,451 | B2 | 12/2009 | Vock et al. |

(Continued)

OTHER PUBLICATIONS

International Search Report dated Nov. 25, 2015, for International Application No. PCT/US2015/045922, Applicant R.R. Donnelley & Sons Company (5 pages).

(Continued)

*Primary Examiner* — Travis Hunnings
*Assistant Examiner* — Omar Casillashernandez
(74) *Attorney, Agent, or Firm* — McCracken & Gillen LLC

(57) ABSTRACT

According to one aspect, a monitoring device for detecting when an object may be subjected to a condition includes a processor, a sensor, and a configuration circuit. The sensor is adapted to detect if the object is subjected to at least a first magnitude of the particular condition. The configuration circuit may be used to specify a second magnitude of the particular condition, wherein the second magnitude is greater than the first magnitude. The processor remains in an inactive state if the object is subjected to a magnitude of the particular condition less than the second magnitude, and the sensor generates a signal in response to detection of object being subjected to at least the second magnitude of the particular condition. In response to the signal, the processor enters an active state to develop an indication of at least the second magnitude of the particular condition.

14 Claims, 11 Drawing Sheets

(56) References Cited

U.S. PATENT DOCUMENTS

| | | | |
|---|---|---|---|
| 7,737,839 B1 * | 6/2010 | Jones | D06F 3/005 340/539.1 |
| 7,856,339 B2 | 12/2010 | Vock et al. | |
| 8,126,675 B2 | 2/2012 | Vock et al. | |
| 8,203,446 B2 * | 6/2012 | Tsubota | H04W 48/02 340/539.1 |
| 8,219,466 B2 | 7/2012 | Gui et al. | |
| 8,280,682 B2 | 10/2012 | Vock et al. | |
| 8,354,927 B2 | 1/2013 | Breed | |
| 8,428,904 B2 | 4/2013 | Vock et al. | |
| 8,618,914 B2 | 12/2013 | Bachman et al. | |
| 2005/0156711 A1 * | 7/2005 | Aljadeff | G01S 5/06 340/10.34 |
| 2006/0103534 A1 * | 5/2006 | Arms | E01F 13/12 340/572.1 |
| 2013/0317659 A1 | 11/2013 | Thomas et al. | |

OTHER PUBLICATIONS

International Written Opinion dated Nov. 25, 2015, for International Application No. PCT/US2015/045922, Applicant R.R. Donnelley & Sons Company (6 pages).

* cited by examiner

APPARATUS AND METHOD FOR MONITORING A PACKAGE DURING TRANSIT

CROSS REFERENCE TO RELATED APPLICATIONS

The present application claims benefit of U.S. Provisional Patent Application No. 62/039,237, filed Aug. 19, 2014, and having the title "APPARATUS AND METHOD FOR MONITORING A PACKAGE DURING TRANSIT." The entire contents of this application are incorporated herein by reference.

FIELD OF THE DISCLOSURE

The present subject matter relates to an apparatus and method for monitoring a package during transit, and more particularly, to monitoring forces and environmental conditions to which the package is subjected during transit.

BACKGROUND OF THE DISCLOSURE

When a good is shipped, damage may occur to the good if the package in which the good is carried is subjected to a large force, for example, by being dropped, if the package is exposed to extremes in temperature and/or humidity, if the package is exposed to certain chemicals such as nicotine or carbon monoxide, radiation including visible or invisible light, or if the package is tampered with. Some goods may be particularly susceptible to damage from external forces or environmental extremes. For example, glassware, electronic instruments, mechanical parts, and the like may be damaged if dropped or subjected to excessive acceleration. Similarly, electronics, liquids, and pharmaceuticals may be harmed if exposed to temperatures and/or humidity outside of predetermined ranges.

Further, damage to a good may not be apparent simply by inspecting the good. Exposure to forces or extremes in temperature may not cause visually perceptible changes, but may affect the operating characteristics, effectiveness, and/or longevity of the good. For example, the effectiveness of the pharmaceutical may be altered if such pharmaceutical is exposed to extreme temperatures. Similarly, electronic boards in a device may become unseated from connectors if such device is subjected to excessive acceleration, as may occur from being dropped or jostled.

In addition, when a recipient reports to a sender that the good was damaged in transit, it may be difficult to ascertain when during transit the damage occurred, and who is accountable for such damage. Further, it may be difficult to confirm whether the damage to the good occurred during transit or after the good was received by the recipient.

Monitoring devices have been developed that can track the progress of a good during shipment. Such monitoring devices typically include a processor, memory, one or more sensors, and a Radio Frequency Identification (RFID) transceiver. Such a device may include an accelerometer to measure any forces acting on the device, or an environmental sensor that measures, for example, the temperature and/or humidity in the environment surrounding the device. Such a device may be affixed to a package to be shipped, and a processor in the device periodically polls the one or more sensors to acquire therefrom measurements associated with forces acting on the package and/or the environmental conditions. The processor then records such measurements and a timestamp of when such measurement was acquired in the memory associated with the RFID transceiver. An RFID reading device may later be used to read a log of measures associated with the forces and environmental conditions encountered by the package to which the monitoring device was affixed. Such log may be analyzed to determine if the package encountered extraordinary forces and/or environmental conditions.

In the monitoring device described above, the processor is powered and becomes active periodically to poll the sensors in the device. Such a device may require a battery with sufficient capacity to allow the processor to become active many times while the package is in transit. A battery that has sufficient capacity may be bulky and may add to the cost of the device. Because the processor remains active, heat sinks may also have to be used to draw heat away from the monitoring device and the package. Because of these considerations, such devices may be larger, heavier, and more expensive to be used routinely.

SUMMARY

According to one aspect, a monitoring device for detecting that an object may is subjected to a particular condition includes a carrier, a processor, a sensor configured to detect when the object is subjected to at least a first magnitude of the particular condition, and a configuration circuit for specifying a configuration parameter. The configuration parameter includes a second magnitude of the condition, the second magnitude being greater than the first magnitude. The configuration circuit includes two conductive traces associated with the configuration parameter, and coupling the two conductive traces specifies the second magnitude. The two conductive traces are disposed between the carrier and a further carrier, and the coupling occurs through an aperture of the further carrier. The processor remains in an inactive state if the object is subjected to a magnitude of the particular condition less than the second magnitude, the sensor generates a signal in response to detection of object being subjected to a third magnitude of the particular condition, and in response to the signal the processor enters an active state to develop an indication of the third magnitude of the particular condition, wherein the third magnitude is greater than or equal to the second magnitude.

According to a further aspect, a monitoring device for detecting that an object has been subjected to a particular condition includes a carrier disposed on the object, a processor disposed on the carrier, a sensor disposed on the carrier, and a configuration circuit for specifying a configuration parameter. The sensor is adapted to detect when the object is subjected to at least a first magnitude of the particular condition. The configuration parameter includes a second magnitude of the particular condition, wherein the second magnitude is greater than the first magnitude. The configuration circuit includes two conductive traces that may be decoupled, and decoupling the two conductive traces specifies the second magnitude. The monitoring device also includes a further carrier having a removable tab, wherein removing the removable tab decouples the two conductive traces. The processor remains in an inactive state if the object is subjected to a magnitude of the particular condition less than the second magnitude, the sensor generates a signal in response to detection of the object being subjected to a third magnitude of the particular condition, and in response to the signal the processor enters an active state to develop an indication of third magnitude of the particular condition, wherein the third magnitude is greater than or equal to the second magnitude.

According to another aspect, a method of detecting that an object has been subjected to a particular condition includes the steps of detecting when the object is subjected to at least a first magnitude of the particular condition, specifying a configuration parameter, and generating a signal. The configuration parameter includes a second magnitude of the particular condition greater than the first magnitude, wherein specifying the configuration parameter comprises a step of coupling two conductive traces of an electrical circuit. The step of coupling the two conductive traces includes the step of accessing the two coupling traces through an aperture in a carrier. The signal is generated in response to detection of the object being subjected to a third magnitude of the particular object. The method includes the steps of operating a processor in an inactive state if the object is subjected to a magnitude of the particular condition less than the second magnitude, and operating the processor in an active state to develop an indication of the third magnitude of the particular condition, wherein the third magnitude is greater than or equal to the second magnitude.

Other aspects and advantages will become apparent upon consideration of the following detailed description and the attached drawings wherein like numerals designate like structures throughout the specification.

DETAILED DESCRIPTION OF THE EMBODIMENTS

Figure 1:
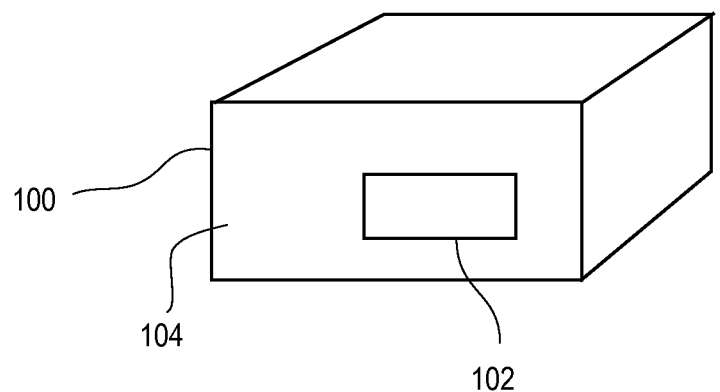
FIG. 1 is an isometric view of a monitoring device affixed to a package in accordance with the present disclosure.

Referring to FIG. 1, an object 100 illustrated in the FIGS. as a package has a monitoring device 102 affixed to an outer surface 104 or any other portion thereof. It should be noted that the object may be any other item(s), e.g., a box or other container, a finished or an unfinished good or goods, whether packaged or not, or any other article or articles. As described below, the monitoring device 102 may be configured to store or otherwise record, in a portion of a memory thereof reserved for monitoring data, or in another device, whether local or remote from the processor, information regarding each instance when the monitoring device 102, and consequently the package 100, is subjected to one or more of, for example, a force, an environmental condition, and an orientation, or other parameter(s) associated with the package 100 that exceed one or more predetermined thresholds. Such stored or recorded information may thereafter be retrieved over a wired or wireless connection, and analyzed to determine condition(s) to which the package was exposed. In one embodiment the monitoring device 102 may develop an indication whether the package 100 was subjected to one or more undesirable conditions, for example, during a particular period of time. The information may also include data indicating, where, when, why, and/or how the object was subjected to the one or more undesirable condition(s) and/or who and/or what caused such undesirable condition(s) to occur. For example, such condition(s) may arise from mishandling of the package 100, for example, by a carrier during a time period when the package 100 was in possession of the carrier.

Other embodiments comprehend the use of analog and/or digital sensors, together with any associated necessary or desirable conditioning and/or interface circuitry that are used together with the processor to develop, more generally, one or more indications of package condition(s), such as, but not limited to, package handling, orientation, package temperature, position, movement, placement in a load, ambient temperature, pressure, and/or humidity, exposure to smoke and/or other gas(es) or material(s) (including biological agent(s)), exposure to nuclear and/or electromagnetic radiation (including visible and invisible light), exposure to magnetic fields, or the like. The monitoring device 102 may also include sensors that indicate that the monitoring device 102 has been tampered with and/or otherwise altered. In general, one or more of any condition(s) may be sensed and the processor may develop an indication of whether a threshold for each such condition was reached or exceeded, and/or a histogram of each such parameter could be developed. Such indication(s) may be stored locally in a memory associated with the processor, and/or such indication(s) may be transmitted to a remote location by any suitable transmission modality, as desired, for analysis, display, and/or any other purpose. Such transmission modalities may include RFID, IEEE 802.11 based or similar WiFi, cellular, Bluetooth, Infrared, Ethernet, and the like.

Figure 2:
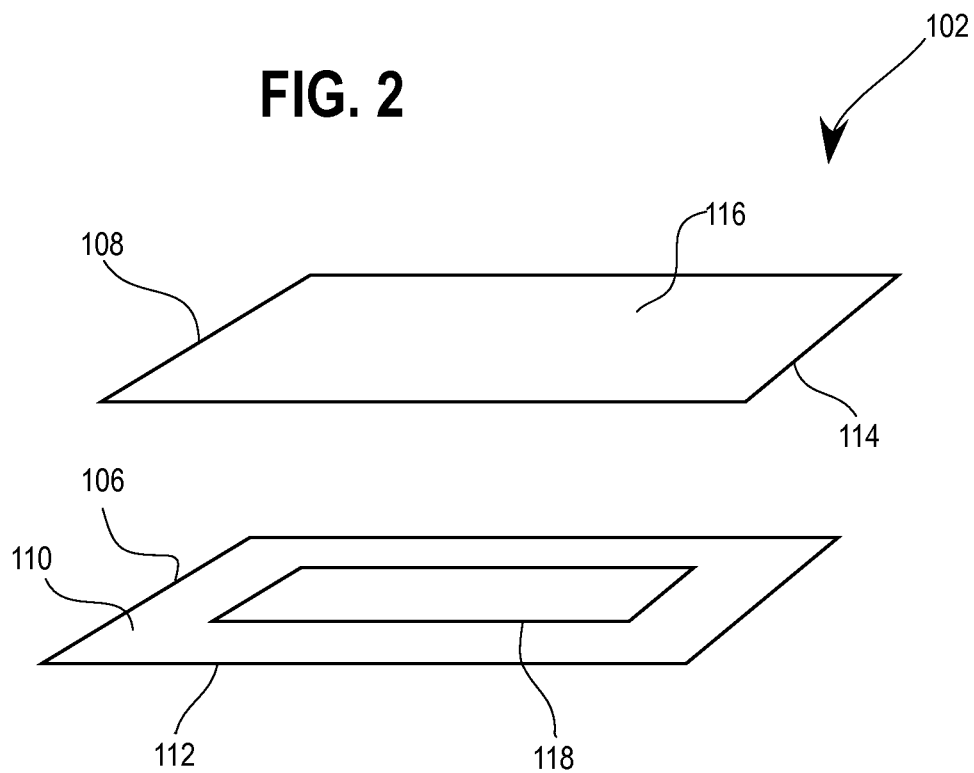
FIG. 2 is an isometric, exploded view of the monitoring device of FIG. 1.

Referring to FIG. 2, in one embodiment, the monitoring device 102 comprises a first carrier or substrate 106 and a second carrier or substrate 108. The first substrate 106 has an inner surface 110 and an outer surface 112, and the second substrate 108 has an inner surface 114 and an outer surface 116. An electronic circuit 118 is disposed between the inner surface 110 of the first substrate 106 and the inner surface 114 of the second substrate 108. At least a portion of the inner surface 110 of the first substrate 106 and the inner surface 114 of the second substrate 108 are affixed to one another to protect the electronic circuit 118 disposed therebetween.

The carriers or substrates 106 and 108 may comprise coated or uncoated paper, textiles, woven materials, plastic, films, gels, epoxies, fiberglass, and combinations thereof. The substrates 106 and 108 that comprise the monitoring device 102 may be manufacturing from identical or different materials.

In some embodiments, one of outer surfaces 112 or 116 may be adhesively or otherwise secured to the outer surface 104 of the package 100. In other embodiments, one of the outer surfaces 112 or 116 may be adhesively secured to an interior surface (not shown) of the package 100. In still other embodiments, the monitoring device 102 may be deposited in the interior (not shown) of the package 100, for example, separate from or secured to one or more goods inside the package 100.

In one embodiment, the electronic circuit 118 may comprise conductive traces deposited or foamed on one of the inner surfaces 110 or 114. One or more electronic components may be adhesively secured to the inner surface 110 or 114 and/or the conductive traces such that each electronic component is aligned with and electrically coupled to the one or more conductive traces. In some embodiments, the conductive traces may be formed by applying a layer of conductive material on the inner surface 110 or 114 and selectively removing, for example, by etching or other removal process, portions of the conductive material thereby leaving the conductive traces. In other embodiments, the conductive traces may be formed by selectively depositing the conductive material on the inner surface 110 or 114 using, for example, ink jet printing. In still other embodiments, the conductive traces may be formed by screen printing the conductive material on the inner surface 110 or 114. The electronic circuit 118 may comprise solder flows and/or conductive adhesives to supply at least portions of conductive traces, or to couple components of the electronic circuit to conductive traces deposited in other ways. Other ways of forming the conductive traces on the inner surface 110 or 114 will be apparent to those who have skill in the art.

In another embodiment, the electronic circuit 118 may comprise a pre-formed circuit on a substrate, for example a printed circuit board, and such substrate may be deposited between the inner surfaces 110 and 114 or the pre-formed circuit may be disposed on either or both of the surfaces 110, 114 or any other surface(s). In some cases, conductive traces may be deposited on one or both of the surfaces 110 and 114, and the components of the circuit may be disposed on a further substrate. The further substrate may then be affixed to one or both of the surfaces 110 and 114 such that the components on the further substrate are electrically coupled with the circuit traces on the one or more surfaces 110 and 114.

Figure 3:
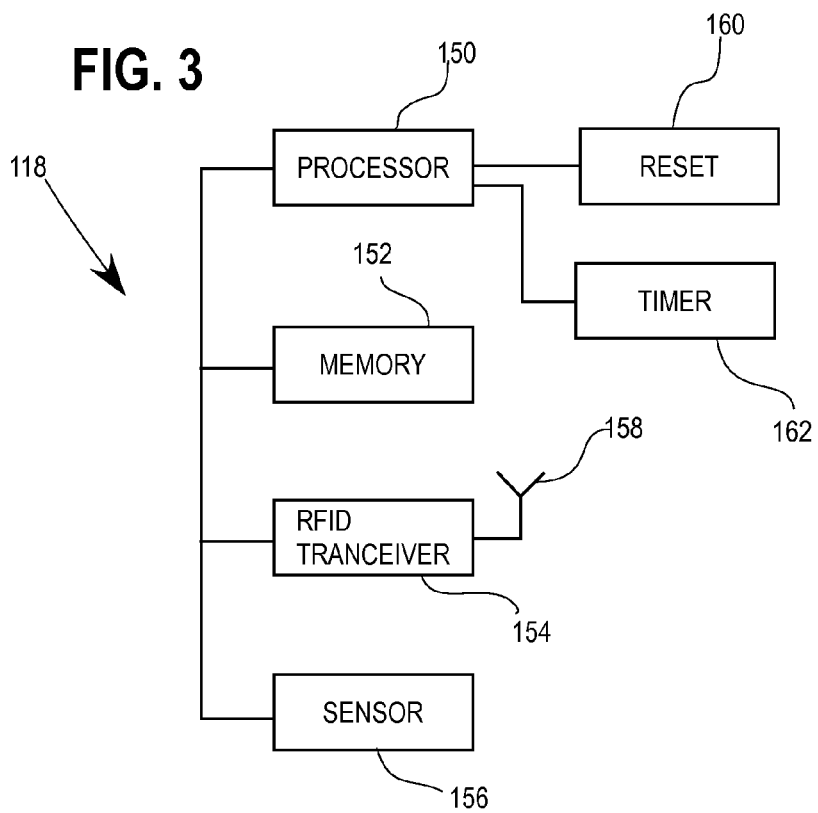
FIG. 3 is a block diagram of an electronic circuit of the monitoring device of FIG. 1.

Referring to FIG. 3, the electronic circuit 118 in the illustrated embodiment comprises a processor 150, a memory 152, an RFID communications transceiver 154, and one or more sensors 156. The RFID transceiver 154 is coupled to one or more antennas 158. The electronic circuit 118 also includes a reset signal generator 160 coupled to processor 150.

In one embodiment, the processor 150, the memory 152, the RFID transceiver 154, and the one or more sensors 156 are coupled with one another to transfer data therebetween. For example, in one embodiment, the processor 150, the memory 152, the RFID transceiver 154, and the sensor 156 may be coupled together and communicate therebetween using serial or parallel communication protocols. Such communication protocols may include for example an architecture in accordance with the Inter-Integrated Circuit (I2C) specification, as specified by NXP Semiconductors of Eindhoven, The Netherlands, a Serial Peripheral Interface (SPI) developed by the Motorola, Inc. of Schaumburg, Ill., and the like. Other ways of coupling such electronic components will be apparent to those who have skill in the art.

The one or more sensors 156 may include an accelerometer, a tilt-meter (which may or may not comprise the noted accelerometer), a temperature sensor, a humidity sensor, a nicotine sensor, a fluid sensor, a carbon monoxide sensor, and the like. In some cases, one sensor 156 may be able to detect multiple conditions. For example, a three-axis accelerometer such as the Xtrinsic MMA8453Q manufactured by Freescale Semiconductor, Inc., of Austin, Tex., may be used to sense both acceleration and tilt. Similarly, a sensor such as the HTU21D(F) Sensor manufactured by Measurement Specialties of Hampton, Va., may be used to sense both humidity and temperature.

Referring to FIGS. 1 and 3, in one embodiment, configuration parameters are supplied to the monitoring device 102 by any suitable device(s), such as a separate processor and/or transceiver, and stored in a predetermined segment of the memory 152 reserved for configuration parameters, as described below. Such configuration parameters specify what forces and/or environmental conditions are to be monitored by the monitoring device 102 and the acceptable ranges and/or thresholds for such forces and/or environmental conditions. If the monitoring device 102 is subjected to a force or environmental condition that is outside of the acceptable range therefor, the processor 150 records in the portion of the memory 152 reserved for monitoring data one or more entries that include, for example, a time when the such force or environmental condition occurred, and the magnitude of such force or environmental condition. Such entry may include additional information as should be apparent to those of ordinary skill in the art.

In some embodiments, the monitoring data recorded by the processor 150 includes a value that indicates an amount of elapsed time between when the reset signal was generated and when the force or environmental condition outside the acceptable range was sensed. The amount of elapsed time may be measured in milliseconds, seconds, ticks of a clock device, or some other time measure. In such embodiments, the monitoring device 102 may not require a way of tracking calendar time (i.e., date, hour, and minute) and instead only use a simple clock that generates a periodic clock or tick signal. In some embodiments, an operator may record the actual time of day when the reset signal was generated on an external device, for example. The calendar time when the force or environmental condition was sensed may be derived by adding the amount of elapsed time represented by the value recorded in the monitoring data and the calendar time recorded when the reset signal was generated.

For example, if the one or more sensors 156 includes a temperature sensor and an accelerometer, the configuration parameters may specify that monitoring device 102 should record in the portion of the memory 152 an entry if the accelerometer detects an acceleration that exceeds 2 g's and a separate entry if the package 100 is subjected to a temperature exceeding 120 degrees Fahrenheit. Such configuration parameters may be selected, for example, in accordance with the contents of the package 100 to which the monitoring device 102 is affixed.

The monitoring device 102 may be affixed to the package 100 before or after the configuration parameters are stored in the portion of the memory 152 reserved for configuration parameters.

Figure 4:
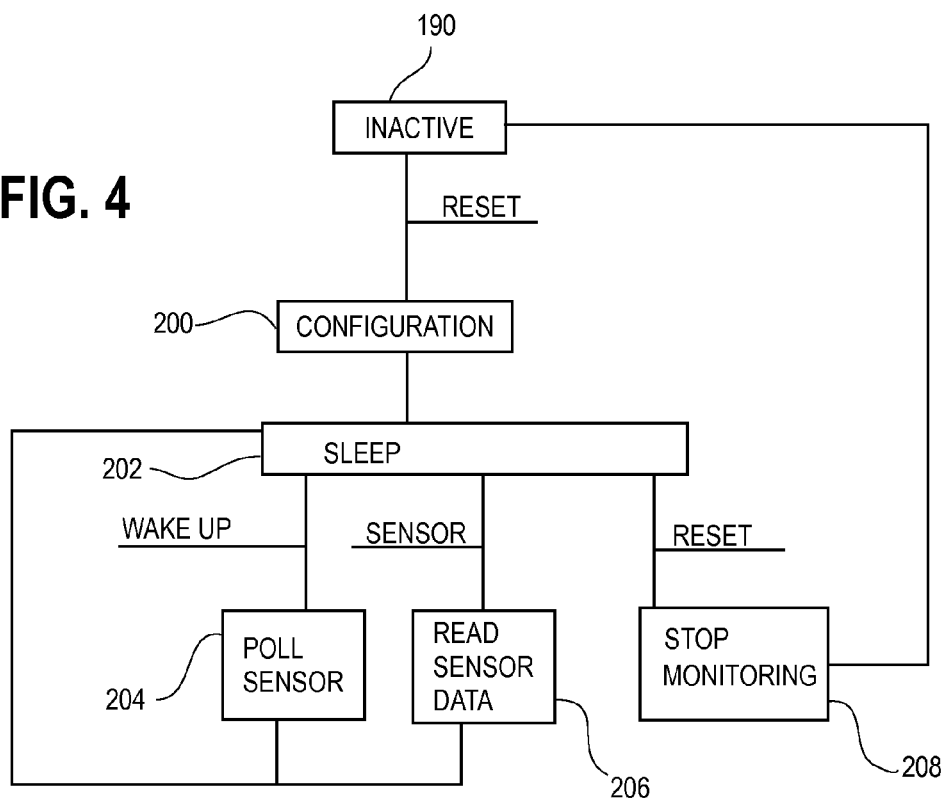
FIG. 4 is a state diagram of operating states of a processor of the electronic circuit of FIG. 3.

Referring to FIGS. 3 and 4, the processor 150 is initially in an inactive state 190 during which the processor 150 in a low power state and undertakes only minimal activity. After the monitoring device 102 is affixed to the package 100, the reset signal generator 160 is actuated to provide a reset signal to the processor 150. In response to such signal, the processor 150 transitions to a configuration state 200, reads the configuration parameters from the portion of the memory 152 reserved for configuration parameters, and configures the processor 150 and/or one or more sensors 156 in accordance with such configuration parameters. In particular, for each condition to be monitored as specified by the configuration parameters, the processor 150 supplies to one of the sensors 156 that can detect such condition the configuration parameters associated with such condition. In some embodiments, the processor 150 may directly communicate such parameters to the selected sensor 156. In other embodiments, the processor 150 may write such parameters to a particular memory location that may be accessed by the sensor 156. In such embodiments, the sensor 156 may load the parameters from the memory location when upon receipt of a signal from the processor 150 or the reset signal generator 160. If the selected sensor 156 is programmable to generate an interrupt upon detection of the particular condition, the processor 150 so programs the selected sensor 156. If the selected sensor 156 cannot generate an interrupt upon detection of the particular condition, the processor 150 adds the particular condition to a list of sensors 156 to be polled periodically wherein such list is stored in the memory 152.

For each sensor 156 that has to be polled periodically, the processor 150 sets an associated timer 162 that generates a periodic wake-up signal. The period of the wake-up signal may be based on the sensor 156 to be polled or the particular condition to be detected. Different predetermined periods of time may be associated with different conditions to be detected. In some embodiments, such predetermined period may be specified by the configuration parameters.

After configuring the sensor(s) 156 and/or setting the timer(s) 162, the processor 150 transitions to a sleep state 202 in which the processor 150 is inactive until a wake-up signal from the timer(s) 162, an interrupt signal from a sensor 156, or a reset signal from the reset signal generator 160 is received, whereupon the processor 150 enters one of three wake-up states.

In some embodiments, when the processor 150 is in the inactive or the sleep state, 190 or 202, respectively, the processor 150 is in a reduced power state to minimize power drain. The processor 150 is minimally active to track time, monitor signals from the timer or an interrupt source coupled to an input the processor 150, and/or execute minimal program instructions.

Specifically, in response to receiving a wake up signal from the timer(s) 162, the processor 150 transitions to a poll sensor state 204. In the poll sensor state 204, the processor 150 checks the stored list of sensors to be polled, and from each such sensor 156 obtains a measurement of the condition detected by such sensor 156. If such measurement exceeds the threshold for such condition as specified by the configuration parameters, the processor 150 records such measurement in the portion of the memory 152 reserved for monitoring data. In one embodiment, the processor 150 also records the time when such sensor 156 was polled. After measurements have been obtained from each sensor 156 in the list of sensors to be polled, and such measurements have been stored or recorded, as appropriate, the processor 150 transitions to the sleep state 202.

In response to receiving a sensor interrupt signal when in the sleep state 202, the processor 150 transitions to a read sensor data state 206. In the read sensor data state 206, the processor 150 determines the sensor 156 that generated the interrupt. In some embodiments, the sensor 156 that generated the interrupt may store data that identifies such sensor 156 in a predetermined segment of the memory 152 before, during, or after generating the interrupt. In such cases, the processor 150 simply reads such data. In other embodiments, the processor 150 polls each sensor 156 to determine which sensor generated the interrupt. After determining which sensor 156 generated the interrupt, the processor 150 obtains the measurement that caused the interrupt to be generated, stores such measurement in the portion of the memory 152 reserved for monitoring data, and in some embodiments, further stores a timestamp of when such measurement was acquired.

In some embodiments, after receiving an interrupt from a particular sensor 156, the processor 150 may configure such sensor 156 not to generate any further interrupts for a predetermined amount of delay time.

In some embodiments, the sensor 156 may be configured to generate a first interrupt when a first measurement associated with a condition being monitored exceeds the pre-configured threshold, as described above. In such embodiments, the sensor 156 may be further configured to generate a second interrupt only if a second measurement associated with the condition is detected and the second measurement exceeds the first measurement.

Thereafter, the processor 150 transitions to the sleep state 202. If desired, the processor 150 may be programmed to remain in the sleep state 202 for a predetermined period of time following execution of programming in the poll sensor state 204 or read sensor data state 206.

In some embodiments, the processor 150 may be configured to respond to a reset signal when in the sleep state 202. In such embodiments, receipt of the reset signal causes the processor 150 to transition to a stop monitoring state 208, in which the processor 150 instructs the timer 162 to disable any scheduled wake-up signals, and the sensors 156 to disable any interrupts that may otherwise be generated by such sensors 156. Alternatively, the processor 150 may be programmed to ignore any wake-up signals and interrupts. In such embodiment, the processor 150 may record in the portion of the memory 152 reserved for monitoring data that the reset signal was received thereby, and in some cases, a timestamp when the reset signal was received. Thereafter, the processor 150 transitions to the inactive state 190 until a further reset signal is received.

Instructions executed by the processor 150 to undertake the actions during the states described above may be stored in a non-transient memory internal to the processor 150 or in a predetermined segment of the memory 152 reserved for program instructions. Such memory may also include default or predetermined configuration parameters that may be used if additional or different configuration parameters are not supplied to the monitoring device 102. The monitoring device 102 may comprise a programmable element, discrete components, firmware, or a combination thereof and the functions undertaken by the processor 150 may be implemented by programming and/or by hardware and/or firmware as desired. In some embodiments, the processor 150, and memory in which to store instructions executed by such processor 150 to operate the monitoring device 102, may be provided by an individual component such as an application-specific integrated circuit (ASIC), a field-programmable gate array (FPGA), a discrete logic device, a state machine, and the like.

Figure 5:
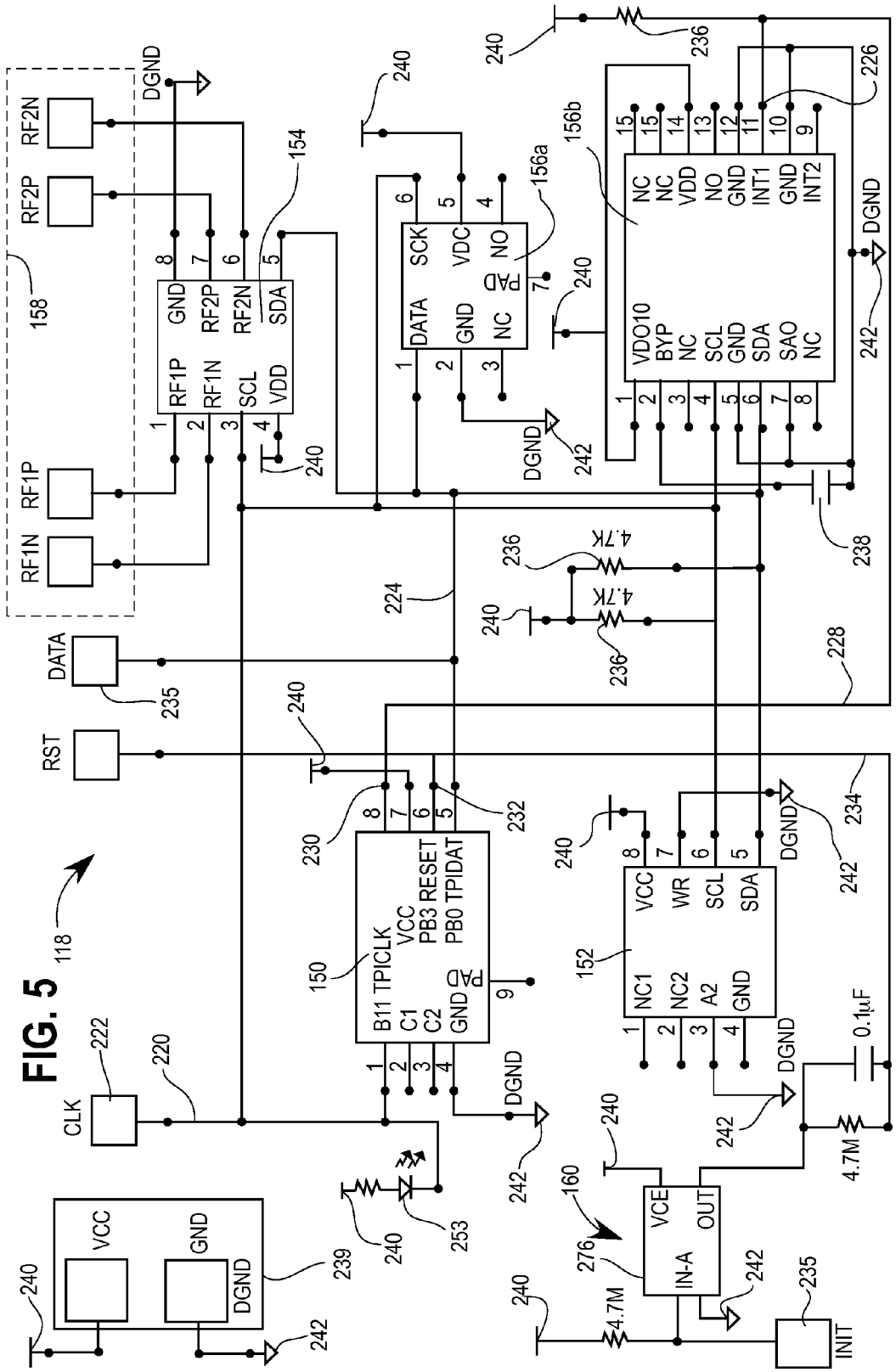
FIG. 5 is a schematic diagram of the electronic circuit of FIG. 3.

Referring to FIG. 5, in an exemplary embodiment of the electronic circuit 118 of the monitoring device 102, the processor 150, the memory 152, and the RFID transceiver 154 are coupled by a conductive trace 220 to an output of a clock signal source 222. A data input and output pin of each of the components 150, 152, and 154 is coupled to a common conductive trace 224. In accordance with the I2C protocol, a clock signal supplied by the clock signal source 222 on the conductive trace 220 provides a timing signal to gate the data transmitted or received on the conductive trace 224.

Continuing with FIG. 5, the illustrated electronic circuit 118 includes a humidity and temperature sensor 156a and an accelerometer and tilt sensor 156b. In this specific embodiment the humidity and temperature sensor 156a does not generate interrupt signals in response to detection of particular humidity levels and/or temperatures. Therefore, as described above, the processor 150 polls the humidity and temperature sensor 156a periodically to determine if such environmental conditions exceed the thresholds supplied for such conditions in the configuration parameters.

The accelerometer and tilt sensor 156b may be configured with particular tilt and/or force thresholds, and in the illustrated embodiment generates an interrupt on an output 226 thereof if such threshold is exceeded. The output 226 of the accelerometer and tilt sensor 156b is coupled by a conductive trace 228 to an input pin 230 of the processor 150. When the processor 150 is in the sleep state 202, an interrupt signal on the input pin 230 causes a transition of the processor 150 from the sleep state 202 to the read sensor data state 206 to store data from the sensor 156b in the portion of the memory 152 reserved for monitoring data. As described above, the processor 150 may also store a timestamp of when the interrupt signal was generated in the portion of the memory 152, in addition to the data from the sensor 156b.

The reset signal generator 160 is coupled to an input pin 232 of the processor 150 by a conductive trace 234. In some embodiments, actuation of the reset signal generator 160 causes a predetermined high state reset voltage to be developed on the conductive trace 234, and in response thereto, the processor 150 responds to such reset signal as described above. In other embodiments, actuation of the reset signal generator 160 causes a predetermined low state reset voltage to be developed on the conductive trace 234, in turn to cause the processor 150 to respond as described above. Actuation of a reset actuator 235 may cause the reset signal generator 160 to generate the reset signal. In some embodiments, the reset actuator 235 may include a switch that is actuated, a pair of conductive traces are coupled, a pair of conductive traces are decoupled, and/or a removable tab.

In some embodiments, the electronic circuit 218 includes a data pad 235 to which an external device may be connected to monitor data and/or signals transmitted over the conductive trace 234, for example, for diagnostic purposes.

The electronic circuit 118 also includes pull-up resistors 236 to permit interrupts and data to be written and read and a capacitor 238 that facilitates proper operation of the sensor 156b. In addition, a battery 239, for example, a thin-film battery, provides voltage to a power rail 240 from which the components of the electronic circuit 118 may draw power, and a common ground 242.

Figure 6A:
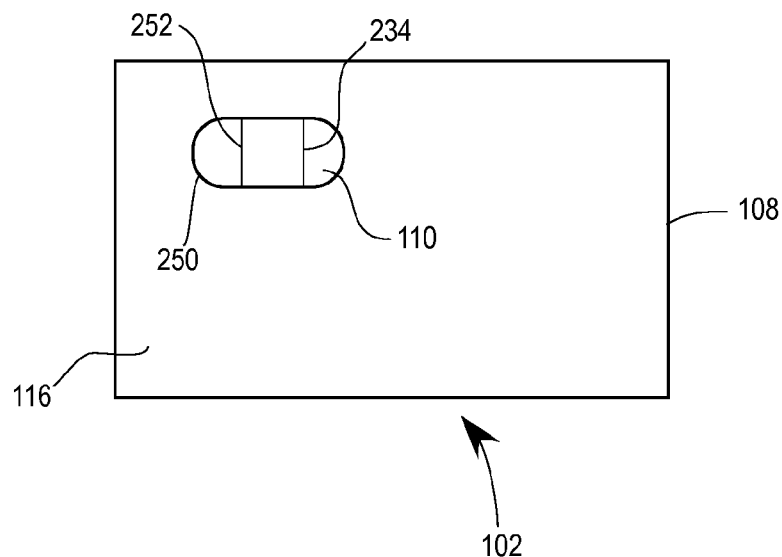
FIG. 6A is a plan view of an embodiment of the monitoring device of FIG. 1.

Referring to FIG. 6A, the substrate 116 of the monitoring device 102 includes an aperture 250 through which the conductive trace 234 and a conductive trace 252 associated with the reset signal generator 160 are accessible. In one embodiment, after the monitoring device 102 is affixed to the package 100, an operator may electrically short the conductive trace 234 and the conductive 252 by, for example, coupling the two conductive traces 234 and 252 with a conductor, such as a metal object, a push button, a soft button, and the like. Such coupling causes a reset signal to be generated on the conductive trace 234, which as described above, is coupled to an input pin 232 of the processor 150.

Figure 6B:
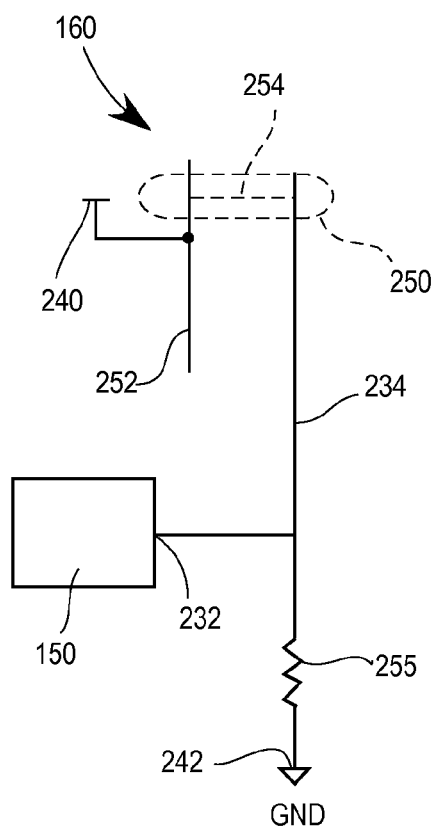
FIGS. 6B and 6C are schematic diagrams of portions of circuits that may be used in the monitoring device of FIG. 6A.

Referring to FIG. 6B, in one embodiment, the conductive trace 252 is coupled to the power rail 240 and the conductive trace 234 is coupled to both the input pin 232 and, through a resistor 255, to the common ground 242. Coupling the conductive trace 252 and the conductive trace 234 (as illustrated by the dashed line 254) through the aperture 250 generates a high state voltage on the conductive trace 234, and hence at the input pin 232. The processor 150 may sense the high state voltage at the input pin 232 as a reset signal.

Figure 6C:
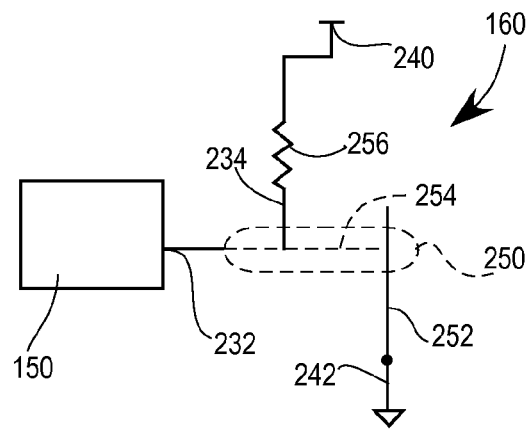

Referring to FIG. 6C, in another embodiment, the power rail 240 is connected, through a resistor 256, to the conductive trace 234. The conductive trace 234 is connected to the input pin 232 of the processor 150. The conductive trace 252 is connected to common ground 242. Coupling the conductive traces 234 and 252 causes a low state voltage to be generated on the conductive trace 234, and hence at the input pin 232. The processor 150 may sense such low state voltage at the input pin 232 as a reset signal.

It will be apparent to those who have skill in the art that the circuit shown in FIG. 6B may be used with a processor 150 that expects an active high reset signal, and the circuit shown in FIG. 6C may be used with a processor 150 that expects an active low reset signal.

In some embodiments, the electronic circuit 118 may comprise a light emitting diode 253 that is briefly illuminated when the processor 150 is reset. In some embodiments, the processor 150 may illuminate such light emitting diode when the processor 150 receives the reset signal. In other embodiments, the reset signal generator 160 may illuminate such light emitting diode when the reset signal is generated. The electronic circuit 118 may include other types of components such another type of light emitter, a sound generator, a vibration generator, and the like that may be actuated instead of or in addition to the light emitting diode to indicate when the processor 150 is reset.

Figure 7A:
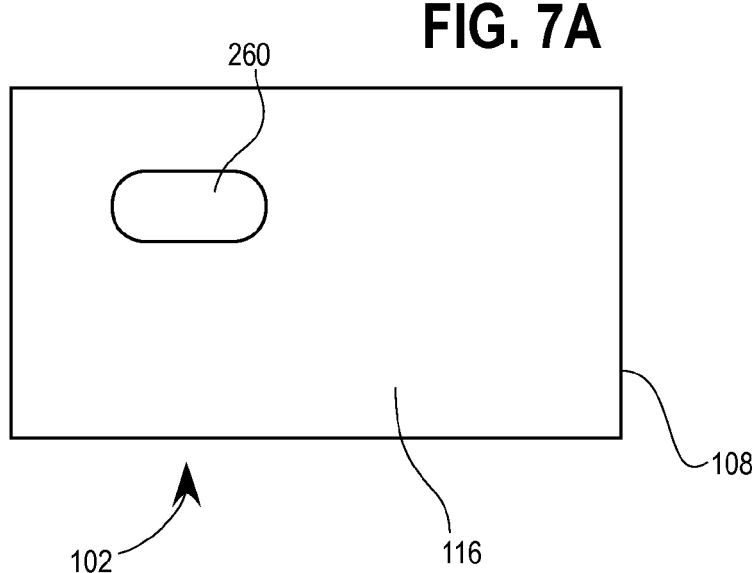
FIG. 7A is a plan view of another embodiment of the monitoring device of FIG. 1.
Figure 7B:
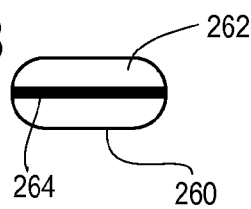
FIG. 7B is a plan view of a removable tab of the monitoring device of FIG. 7A.
Figure 7C:
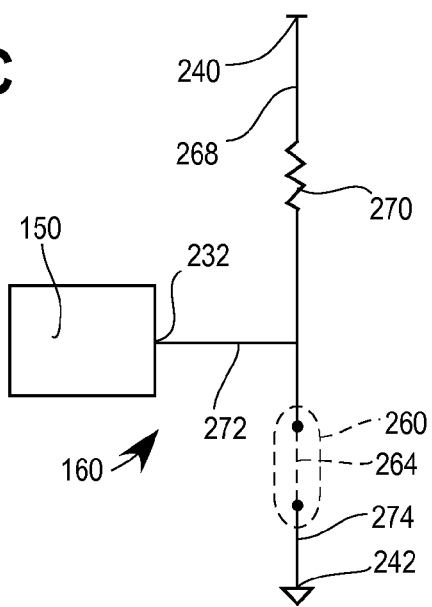
FIG. 7C is a schematic diagram of a portion of a circuit that may be used in the monitoring device of FIG. 7A.

Referring to FIGS. 7A, 7B, and 7C, in some embodiments, the substrate 108 (FIG. 2) includes a perforated removable tab 260 associated with the reset signal generator 160. In some embodiments, removable tab 260 may not be perforated, but instead may be sticker that is adhered to the inner surface 110 (FIG. 2) of the first substrate 106 through an aperture in the substrate 108. A portion of a surface 262 of the tab 260 that faces the electronic circuit 118 (FIG. 2) includes a conductive portion 264. A conductive trace 268 from the power rail 240 is coupled, via a resistor 270, to a conductive trace 272. The conductive trace 272 coupled to the input pin 232 of the processor 150. When the tab 260 is in place, the conductive portion 264 further couples the conductive trace 272 to a conductive trace 274 that is coupled to the common ground 242. When the tab 260 is in place, because the power 240 is coupled to the common ground 242, little voltage from the power rail 240 is sensed at the input pin 232. When the tab 260 is removed, high state voltage at the power rail 240 is sensed at the input pin 232 and detected as a reset signal by the processor 150.

Figure 7D:
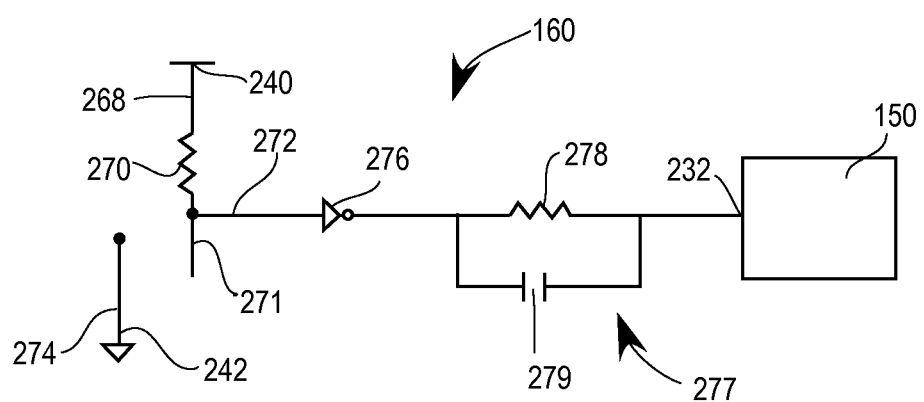
FIG. 7D is a schematic diagram of a portion of a circuit that may be used in the monitoring device of FIG. 6A or 7A.

Referring to FIG. 7D, in some embodiments, the monitoring device 102 may include a reset signal generator 160 actuated by either shorting conductive traces or removing a perforated tab. In one such embodiment, the conductive trace 268 from the power rail 240 is coupled via the resistor 270 to the conductive trace 272. The conductive trace 272 is coupled to an input of an inverter 276. The output of the inverter 276 is coupled to a resistor-capacitor circuit 277 comprising a resistor 278 and a capacitor 279. The output of the resistor-capacitor circuit 277 is coupled to the input pin 232 of the processor 150. The resistor-capacitor circuit 277 may be used to regulate the power provided to the input pin 232. In one embodiment, the resistors 270 and 278 have a resistance value of 4.7 megaohms and the capacitor has a capacitance value of 0.1 microfarad.

Continuing with FIG. 7D and also referring to FIG. 6A, a conductive trace 271 is coupled to the conductive trace 272. Further, a conductive trace 274 is coupled to common ground 242. In one embodiment, coupling the conductive trace 271 and the conductive trace 274 may generate a reset signal. For example, portions of the conductive traces 271 and 274 may be exposed through the aperture 250, and a metal object may be used to short such exposed portions. Alternately, these conductive traces 271 and 274 may be coupled by actuating a push button, a soft button, and the like. Coupling the conductive traces 271 and 274 causes the voltage at the conductive trace 272 to drop, and therefore, the voltage present at the input 232 of the processor 150 to rise. A processor 150 that reacts to a high active sense reset signal may sense such change in voltage as a reset signal.

Alternately, referring to FIGS. 7A-7D, the conductive traces 271 and 274 may be covered by a perforated tab (or sticker) 260 so that such conductive traces are coupled to one another by the conductive trace 264. Removing the perforated tab 260 may cause in the voltage present at the conductive trace 272 to rise, and the voltage present at the input pin 232 to drop. A processor 150 that reacts to a low sense reset signal may sense such change in voltage as a reset signal.

In some embodiments, the reset signal generator 160 may not include the inverter 276. In such embodiments, coupling the traces 271 and 274 cause a drop in the voltage present at the input pin 232. The processor 150 may sense such drop as a reset signal if the processor 150 reacts to a low active sense reset signal. Similarly, removing the coupling tab from the traces 271 and 274 may cause an increase in the voltage present at the input pin 232, and in response, the processor 150 may sense such increase as a reset signal if the processor 150 reacts to a high active sense reset signal.

Referring again to FIG. 5, in some embodiments, configuration parameters may be supplied to monitoring device 102 by transmitting such parameters to the RFID transceiver 154 via one or more RFID antennas 158. Upon receipt of such transmission, the RFID transceiver 154 writes the received configuration parameters in the portion of the memory 152 reserved for configuration parameters. In other embodiments, the monitoring device 102 includes uncovered or covered apertures through which conductive traces may be shorted or opened, to cause the configuration parameters to be supplied to the processor 150 and the memory 152. In some embodiments, such apertures may be covered with removable tabs, and removal of one or more such tabs decouples conductive traces associated with the tab, and thereby selects the configuration parameters supplied to the processor 150 and the memory 152. Configuration parameters may be supplied to some embodiments of the monitoring device 102 using a combination of transmission to the RFID transceiver(s) 154, removal of one or more tabs, and shorting or opening of one or more pairs of conductive traces.

Figure 8A:
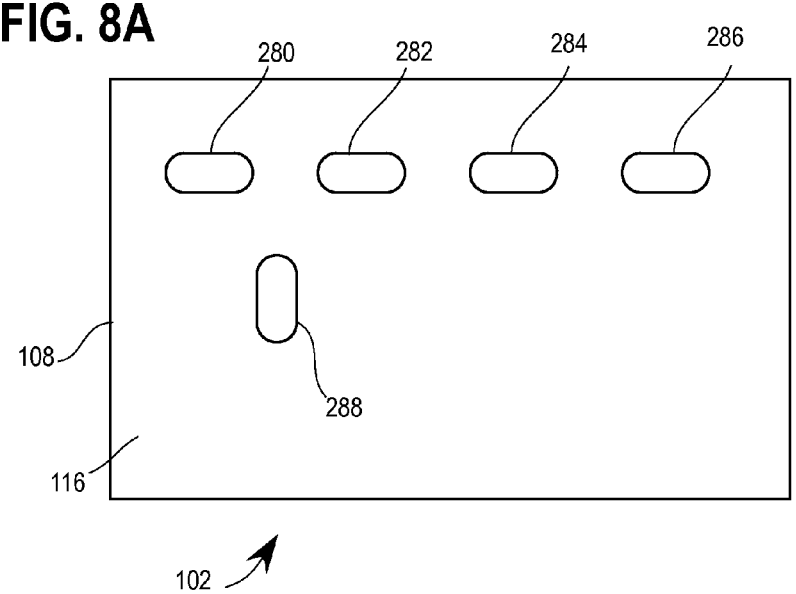
FIG. 8A is a plan view of another embodiment of the monitoring device of FIG. 1.
Figure 8B:
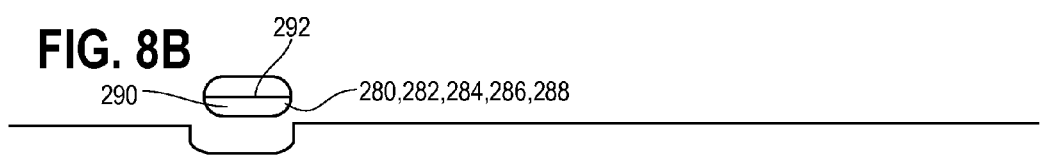
FIG. 8B is a plan view of a removable tab of the monitoring device of FIG. 8A.
Figure 8C:
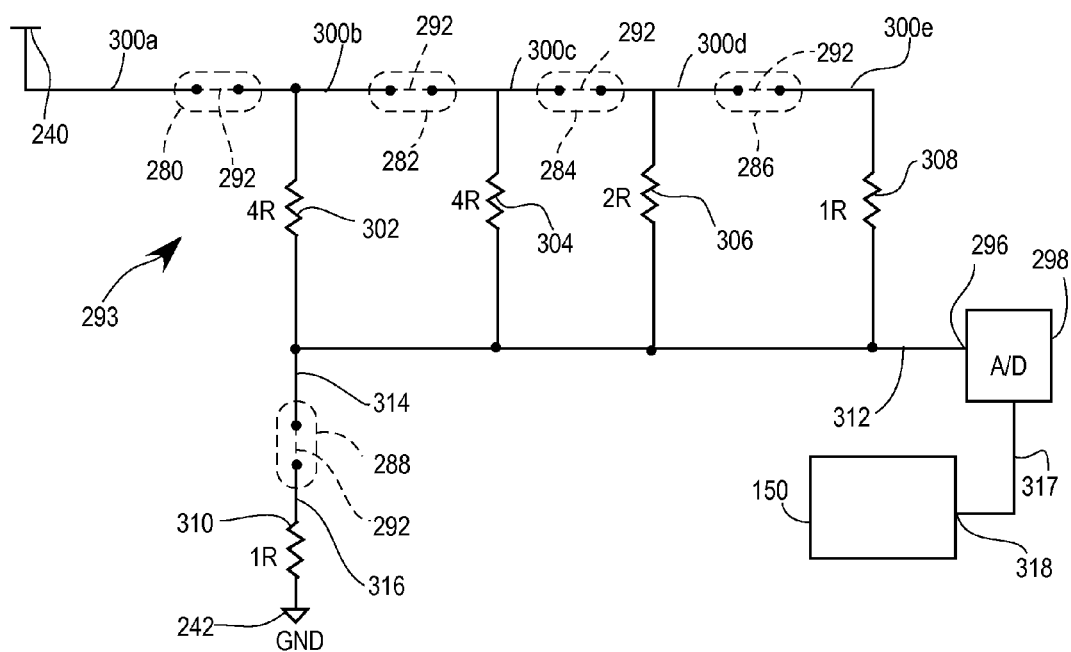
FIG. 8C is a schematic diagram of a portion of a circuit that may be used in the monitoring device of FIG. 8A.

Referring to FIGS. 8A, 8B, and 8C, in one embodiment of the monitoring device 102, the substrate 108 may include additional tabs 280, 282, 284, 286, and 288. If all of the tabs 280, 282, 284, 286, and 288 are in place, then the monitoring device 102 is configured with default configuration parameters, for example, upon generation of a reset signal. One of these tabs, or combinations thereof, may be removed to supply different configuration parameters to the monitoring device 102. For example, the default configuration parameters may specify that the monitoring device 102 is to monitor for tilt of the monitoring device 102 that exceeds a first tilt angle in a particular tilt plane. Removing the tab 280 may configure the monitoring device 102 to detect tilt of the monitoring device 102 in the same or a different tilt plane that exceeds a second predetermined tilt angle. Alternately, removing the tab 282 may configure the monitoring device 102 to monitor and record a tilt that exceeds a third predetermined tilt angle in the same or a different tilt plane. Removing the tab 284 may configure the monitoring device 102 to sense and record a condition in which the monitoring device 102 is subjected to an acceleration magnitude that exceeds a particular predetermined acceleration magnitude. Removing the tab 286 may configure the monitoring device 102 to sense and record a condition in which the monitoring device 102 is subjected to humidity that is outside a predetermined first humidity range. Removing the tab 288 may configure the monitoring device 102 to detect a condition in which the monitoring device 102 is subjected to humidity that is outside a second predetermined humidity range. The processor 150 senses which of the tabs 280, 282, 284, 286, and 288, has been removed and stores corresponding configuration parameters in the portion of memory 152 reserved for the configuration parameters accordingly. Such configuration parameters may relate to detection of a single or multiple events in connection with a single parameter, or may relate to detection of single or multiple events in connection with multiple parameters.

In the illustrated embodiment, a surface 290 of each of the tabs 280, 282, 284, 286, and 288 that faces the electronic circuit 118 includes a conductive portion 292 that couples conductive traces described below of the electronic circuit 118. In addition to the components described above, the electronic circuit 118 may, for example, include a resistor ladder circuit 293 (FIG. 8C) interposed between the power rail 240, the common ground 242, and an input 296 of an analog-to-digital converter 298. The resistor ladder circuit 293 is coupled to the power rail 240 by a conductive trace 300a. The resistor ladder circuit 293 includes resistors 302, 304, 306, 308, and 310. The presence or absence of the tabs 282, 284, 286, and 288 selects the resistors 302, 304, 306, 308, and 310 through which current flows from the power rail 240 to the input 296 of analog-to-digital converter 298, and thereby determines a proportion of the voltage at the power rail 240 that is detected at the input 296 of the analog-to-digital converter 298.

If the tab 280 is removed, no voltage is sensed at the input pin 296. When the tab 280 is removed, the presence or absence of any of the other tabs 282, 284, and 286 does not affect the voltage sensed at the input pin 296.

If the tab 288 is removed and the tabs 280, 282, 284, and 286 are in place, the voltage sensed at the input pin 296 is identical to the voltage at the power rail 240. If both tabs 280 and 288 are in place, the voltage sensed at the input pin 296 depends on which, if any, one of the tabs 282, 284, and 286 has been removed.

When the tab 280 is in place, the conductive portion 296 of the tab 280 couples the conductive trace 300a to a conductive trace 300b. Current from the power rail 240 flows through the conductive trace 300a, through the conductive portion 292 of the tab 280, through the conductive trace 300b, through at least the resistor 302, to a conductive trace 312 that is coupled to the input 296. Removing tab 280 breaks the conductive coupling between the conductive traces 300a and 300b so that no voltage from the power rail 240 is detected at the input pin 296.

If the tab 288 is also in place, a portion of the current from the conductive trace 300b flows through conductive trace 314, through the conductive portion 292 of the tab 288, through a conductive trace 316, and through the resistor 308 to the common ground 242.

If the tabs 280 and 282 are both in place, the conductive portion 292 of the tab 282 couples the conductive trace 300b to a conductive trace 300c. A portion of the current from the power rail 240 present on the conductive trace 300b flows through the conductive portion 292 of the tab 282, through conductive trace 300c, through the resistor 304, and through the conductive trace 312 to the input pin 296.

If the tab 284 is also in place, the conductive portion 292 of the tab 284 couples the conductive trace 300c and a conductive trace 300d so that a portion of the current from the power rail 240 flows through the conductive traces 300c and 300d, through the resistor 306, and through the conductive trace 312 to the input pin 296.

If the tab 286 is also in place, the conductive portion 292 of the tab 286 couples the conductive trace 300d and a conductive trace 300e. A portion of the current from the power rail 240 flows through the 300d and 300e, through the resistor 308, and through the conductive trace 312 to the input pin 296

The presence or absence of tabs 280, 282, 284, 286, and 288, and the resistance values of the resistors 302, 304, 306, 308, and 310 relative to one another determine the voltage that is detected at the input pin 296 as a fraction of the voltage present at the conductive trace 300a from the power rail 240.

For example, suppose the resistor 310 has a resistance value of R Ohms; and each of the resistors 302, 304, 306, and 308 has a resistance value 4*R, 4*R, 2*R, and R Ohms, respectively, and the voltage present at the conductive trace 300a is V volts. In this example, the voltage detected at the input 296 when one the tabs 280, 282, 284, 286, and 288 is removed is as follows:

| Tab Removed | Resistors in Circuit | Voltage at input 296 |
| --- | --- | --- |
| None | 302, 304, 306, 308, 310 | 0.67 * V |
| 280 | None | 0 * V |
| 282 | 302, 310 | 0.2 * V |
| 284 | 302, 304, 310 | 0.33 * V |
| 286 | 302, 304, 306, 310 | 0.5 * V |
| 288 | 302, 304, 306, 308 | V |

In one embodiment, the resistance value of each of the resistors 302 and 310 may be one of one mega-ohm, 10 mega-ohms, or 100 mega-ohms. The resistance value of these resistors is selected to minimize power drain by the resistor ladder 290. As would be apparent to one of skill in the art, other resistor values may be selected to determine other voltages that are detected at the input 296. In addition, the resistor ladder 290 may be configured with more or fewer resistors to increase or decrease, respectively, the number of discrete voltage values that may be detected at the input 296.

The analog-to-digital converter 298 converts an analog voltage at the input 296 thereof into a corresponding digital value and communicates such digital value via a conductive trace 317 to an input 318 of the processor 150. In response to receipt of such digital value, the processor 150 stores configuration parameters in accordance with such digital value in the portion of the memory 152 reserved for configuration parameters, as noted above.

Figure 9A:
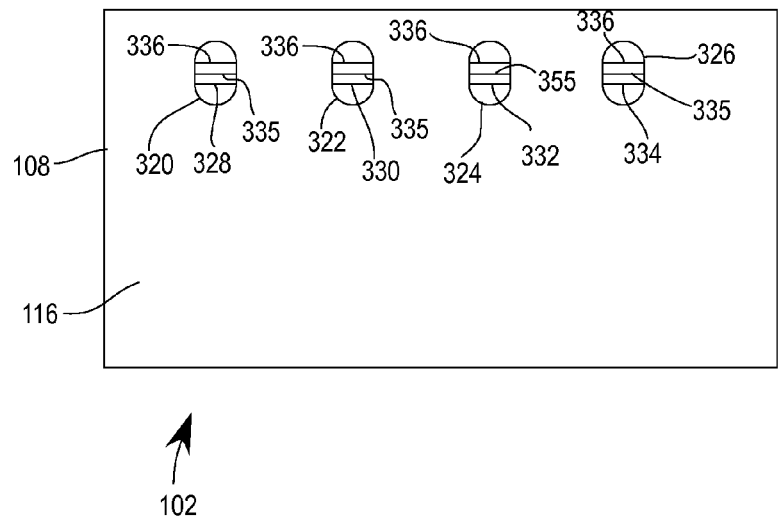
FIG. 9A is a plan view of another embodiment of the monitoring device of FIG. 1.
Figure 9B:
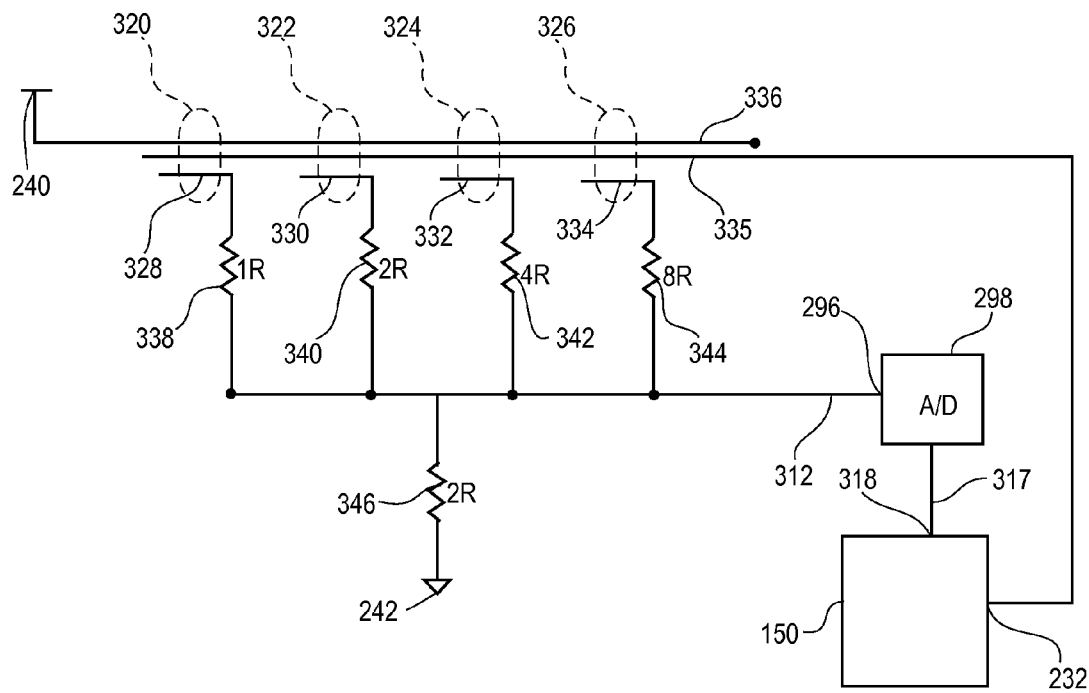
FIG. 9B is a schematic diagram of a portion of a circuit that may be used in the monitoring device of FIG. 9A.

Referring to FIGS. 9A and 9B, in some embodiments, the substrate 108 (FIG. 2) of the monitoring device 102 includes apertures 320, 322, 324, and 326 through which conductive traces 328, 330, 332, 334, and 335, respectively, of the electronic circuit 118 (FIG. 2) are accessible. A conductive trace 336 of the electronic circuit 118 is also accessible through each of the apertures 320, 322, 324, and 326. Coupling the conductive trace 336 to one of the conductive traces 328, 330, 332, and 334, and simultaneously coupling the trace 336 to the conductive trace 335 when the reset signal is generated causes one of a number of predetermined voltages to be provided at an input 296 of the analog-to-digital converter 298, and a reset signal to be sensed at the reset pin 232 of the processor 150. The analog-to-digital converter 298 converts such voltage into a digital value and supplies such digital value to the input 318 of the processor 150 via the conductive trace 317. The processor 150, upon sensing the reset signal, stores the configuration parameters in accordance with such digital value in the portion of the memory 152 reserved for configuration parameters, as before.

As shown in FIG. 9B, the conductive trace 328 is coupled to the conductive trace 312 via a resistor 338, the conductive trace 330 is coupled to the trace 312 via a resistor 340, the conductive trace 332 is coupled to the trace 312 via a resistor 342, and the conductive trace 334 is coupled to the conductive trace 312 via resistor 344. The conductive trace 312 is also coupled, via the resistor 346, to the common ground 242. The conductive trace 335 is coupled to the reset pin 232 of the processor 150. Suppose, for example, the power rail 240 provides a voltage of V, the resistor 338 has a resistance of R ohms, and the resistance of resistors 340, 342, 344, and 346 are 2*R ohms, 4*R ohms, 8*R, and 2*R Ohms, respectively. Under these conditions, the voltage detected at the input 296 of the analog-to-digital converter 298 when one of the conductive traces 328, 330, 332, or 334 is coupled to the conductive trace 336 is as follows:

| Traces coupled | Resistors in Circuit | Voltage at input 296 |
| --- | --- | --- |
| 328 and 336 | 338, 346 | 0.66 * V |
| 330 and 336 | 340, 346 | 0.5 * V |
| 332 and 336 | 342, 346 | 0.33 * V |
| 334 and 336 | 344, 346 | 0.2 * V |

In some embodiments, the conductive trace 335 may not be accessible through the apertures 320, 322, 324, and 326. In such embodiments, the conductive trace 336 is coupled to one of the conductive traces 328, 330, 332, and 334 while a separate reset signal generator 160 (for example, one of the generators described above) is actuated. Actuation of the reset signal generator 160 (e.g., FIG. 3) causes the processor 150 to check the voltage at the input pin 316 and configure the monitoring device 102 accordingly. Alternately, the analog-to-digital 298 may store that most recently sensed voltage level at the input pin 296, the processor 150 retrieves a digital value associated with such voltage level when the reset signal is generated, and the processor 150 configures the monitoring device 102 in accordance with the retrieved digital value.

Figure 10A:
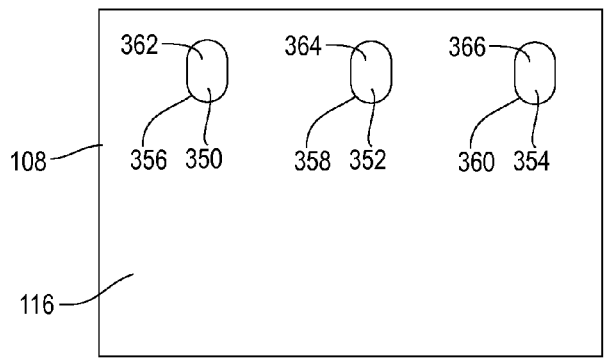
FIG. 10A is a plan view of another embodiment of the monitoring device of FIG. 1.
Figure 10B:
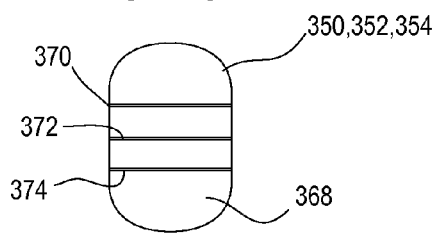
FIG. 10B is a plan view of a removable tab of the monitoring device of FIG. 10A.
Figure 10C:
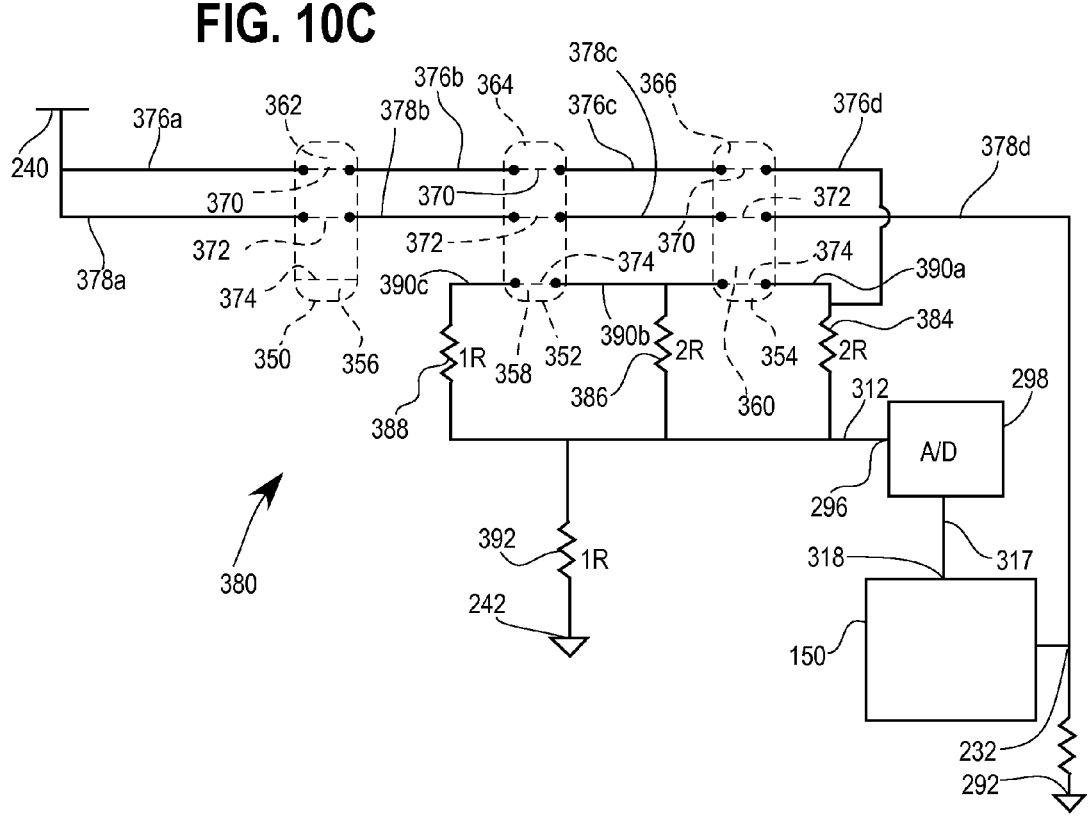
FIG. 10C is a schematic diagram of a portion of a circuit that may be used in the monitoring device of FIG. 10A.

Referring to FIGS. 10A, 10B, and 10C, a further embodiment of the substrate 108 (FIG. 2) of monitoring device 102 includes perforated removable tabs 350, 352, and 354. Each tab 350, 352, and 354 has a bottom portion 356, 358, and 360, respectively, an intermediate portion 357, 359, and 361, respectively, and a top portion 362, 364, and 366, respectively. A surface 368 of each tab 350, 352, and 354 that faces the electronic circuit 118 (FIG. 2) includes conductive portions 370, 372, and 384 that connect certain conductive traces of the electronic circuit 118 to one another. During initialization, the bottom portion 356, 358, and 360 of one or more of the perforated tabs 350, 352, and 354, respectively, is initially pulled away from the electronic circuit 118. Thereafter, the intermediate portion(s) 357, 359, and 361 of the same one or more tabs 350, 352, and 354, respectively, are pulled away, and then the top portion(s) 362, 364, and 366 of the same one or more tabs 350, 352, and 354, respectively, are pulled away from the electronic circuit 118. As described below, releasing the tab 350, 352, or 354 in this manner first defines the configuration parameters for the monitoring device 102, then generates the reset signal that activates the monitoring device 102 and causes storage of the configuration parameters, and finally decouples from the power rail 240 the configuration circuitry associated with the tabs 350, 352, and 354 to extend battery life.

Specifically, the power rail 240 is coupled to conductive traces 376a and 378a. The conductive portion 370 of the tab 362 couples the conductive trace 376a to a conductive trace 376b, the conductive portion 370 of the tab 364 couples the conductive trace 376b to a conductive trace 376c, and the conductive portion 370 of the tab 366 couples the conductive trace 376c to a conductive trace 376d. The conductive trace 376d is coupled to a resistor ladder network 380 that includes resistors 384, 386, and 388. In particular, the conductive trace 376d is coupled to a junction between the resistor 384 and a conductive trace 390a.

When the top portions 362, 364, and 366 of the tabs 350, 352, and 354, respectively, are in place, a voltage V from the power rail 240 is delivered by the conductive traces 376a, 376b, 376c, and 376d via the conductive portions 370 of the tabs 350, 352, and 354, respectively, to the resistor 384. The voltage V is also delivered to the resistors 386 and 388 provided that conductive portions 374 of the tabs 352 and 354 are in place, thereby coupling conductive trace 390a to conductive traces 390b and 390c.

Lifting the bottom portion 360 of the tab 354 away from electronic circuit 118 sufficiently to decouple the conductive traces 390a and 390b disconnects the resistors 386 and 388 from the resistor ladder network 380. Similarly, lifting the bottom portion 358 of the tab 352 sufficiently to decouple the conductive traces 390b and 390c disconnects the resistor 388 from the resistor ladder network 380.

Depending upon which of the bottom portions 358 and 360 is/are in place, current from the conductive trace 376d flows through neither, one, or both of the resistors 386 and 388, to the conductive trace 312 and to the input pin 296. A portion of the current at the conductive trace 312 also flows through the resistor 392 and then to common ground 242.

Suppose the power rail 240 provides a voltage V on the conductive trace 368, the resistor 392 has a resistance value of R Ohms, and the resistors 384, 386, and 388 have resistance values of 2*R, 2*R, and 1*R, respectively, then the bottom portion 374 or 376 may be lifted away from the electronic circuit 118 to control the voltage detected by the analog-to-digital converter 298 at the input 296 as follows:

| Bottom portion released | Resistors in circuit | Voltage at 296 |
|---|---|---|
| None or 350 | 384, 386, 388, 392 | 0.66 * V |
| 354 | 384, 392 | 0.33 * V |
| 352 | 384, 386, 392 | 0.5 * V |

When the tabs 350, 352, and 354 are in place, the conductive portion 372 of the tab 350 couples the conductive trace 378a to a conductive trace 378b, the conductive portion 372 of the tab 352 couples the conductive trace 378b to a conductive trace 378c, and the conductive portion 372 of the tab 354 couples the conductive trace 378c to the conductive trace 378d. The conductive trace 378d is coupled to the input pin 232 of the processor 150. Lifting any of the tabs 350, 352, or 354 sufficiently so the conductive portion 372 thereof decouples the connections between conductive traces 378a and 378b, 378b and 378c, and/or 378c and 378d, decouples the pin 232 from the power rail 240. The processor 150 detects a drop in voltage that occurs when the pin 232 is decoupled from the power rail 240 as the reset signal described above.

Lifting any of the top portions 362, 364, and 366 of the tabs 350, 352, 354 sufficiently to decouple the conductive traces 376a from the conductive trace 376b, conductive trace 376b from the conductive trace 376c, and/or the conductive trace 376c from the conductive trace 376d decouples the resistor ladder network 380 from the conductive trace 312. Such decoupling may conserve power after the monitoring device 102 has been configured and the reset signal has been generated as described above.

Figure 11:
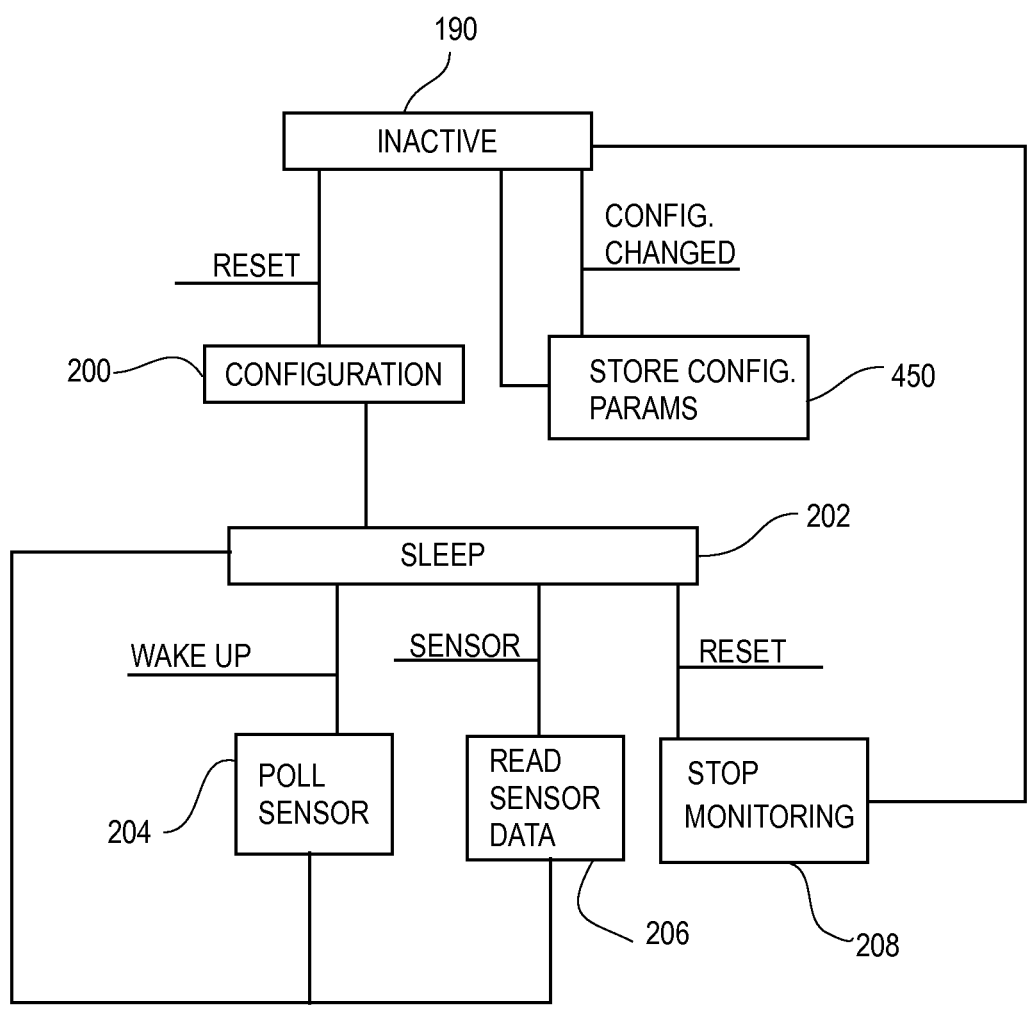
FIG. 11 is another state diagram of operating states of a processor of the electronic circuit of FIG. 1 according to another embodiment.

Referring to FIG. 11, in still further embodiments, the processor 150 enters a store configuration parameters state 450 from the inactive state 190 (described above) when a digital value is received from the analog-to-digital converter 298. In such state 450, the processor 150 reads the digital value, and reads from the memory 152 or an internal memory (not shown) predetermined configuration parameters associated with such digital value, and stores such predetermined configuration parameters in the portion of the memory 152 reserved for configuration parameters. Thereafter, the processor 150 returns to the inactive state 190. The transitions into the configuration state 200 by the processor 150 in response to receipt of a reset signal and the sleep state 202 from the configuration state 200 are as described above in connection with FIG. 4. Similarly, the transitions by the processor 150 into the poll sensor 204, read sensor data 206, and stop monitoring states 208 in response to a wake up signal, a sensor interrupt, and a further reset signal are as described above in connection with FIG. 4.

Figure 12:
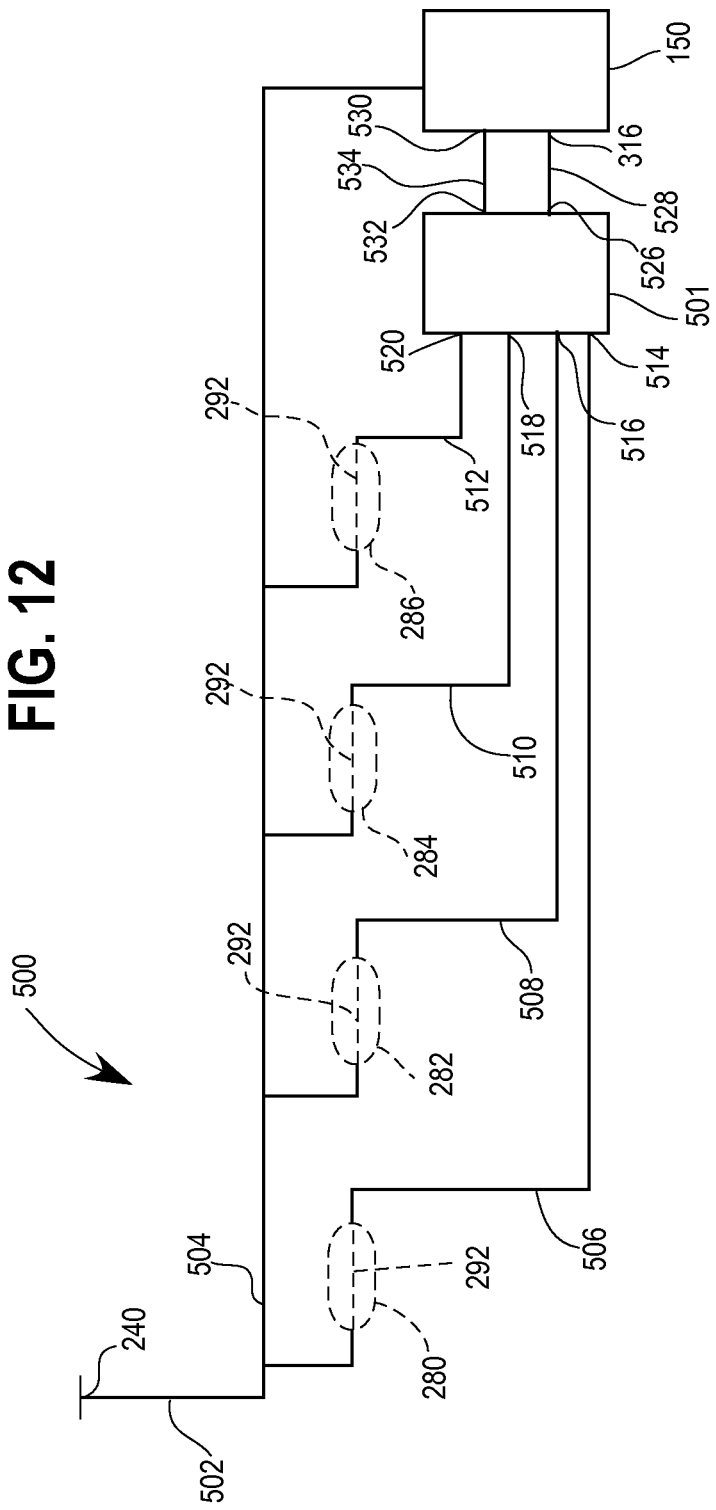
FIG. 12 is a schematic diagram of a portion of a circuit that may be used in the monitoring device of FIG. 8A.

Referring to FIGS. 8A and 12, in some embodiments, the electronic circuit 118 (FIG. 2) of the monitoring device 102 (FIG. 2) may use a circuit 500 that includes a multiplexer 501 to allow the processor 150 (FIGS. 3 and 4) to obtain configuration parameters. The power rail 240 may be coupled via a resistor 502 to a conductive trace 504. The conductive trace 504 may be coupled to conductive traces 506, 508, 510, and 512 by the conductive portion 292 of perforated tabs 280, 282, 284, and 286, respectively. The conductive traces 506, 508, 510, and 512 are coupled to input pins 514, 516, 518, and 520, respectively, of the multiplexer 501. The presence or absence of the tabs 280, 282, 284, and 286 determines whether the multiplexer 501 senses a high signal level or a low signal level at the input pins 514, 516, 518, and 520, respectively. The presence of one or more tabs 280, 282, 284, and 286 causes a high signal level to be present at the input pin 514, 516, 618, and 520, respectively, of the multiplexer 501, and the absence of one or more such tabs causes a low voltage to be present such input pin of the multiplexer 501. An output pin 526 of the multiplexer 501 is coupled by a conductive trace 528 to the input pin 316 of the processor 150. A pin 530 of the processor 150 is coupled to a pin 532 of the multiplexer 501 by a conductive trace 534.

To retrieve configuration parameters, for example, when the processor 150 is reset, the processor 150 generates a signal at the pin 530 thereof, which is sensed by the multiplexer 501 at the pin 532. Such signal may be a transition from a high state to a low state, a transition from a low state to a high state, a particular current or voltage level, a digital value, and the like. In response, the multiplexer 501 generates a signal at the pin 528 that represents which of the tabs 280, 282, 284, and 286 are present (or absent). Such signal may be a particular voltage or current level associated with the combination of the tabs 280, 282, 284, and 286 that are present, or may be a digital value that represents such combination.

Referring to FIGS. 5, 8B, 9B, 10B, and 11, in some embodiments of the monitoring device 102, the processor 150 includes an integral analog-to-digital converter. In such embodiments, the separate analog-to-digital converter 298 shown in FIGS. 8B, 9B, and 10C may not be necessary. Rather, the conductive trace 312 is coupled to an A/D input 318 of the processor 150. In such embodiments, the processor 150 transitions to the configuration state 200 upon detection of a change in voltage at the input 318, as described above.

In a typical processor 150, the input 318 is a high-impedance input, and the outputs of the sensors 156 typically present high-impedances to the conductive traces 224 coupled thereto. Under such circumstances the input 318 of the processor 150 may be coupled to both the trace 312 of FIGS. 8C, 9B, and 10C, and the trace 224 of FIG. 5.

In some embodiments, the processor 150 may control when power is available at the rail 240 to reduce total power consumption of the monitoring device 102. For example, the processor 150 may have a separate power source and drive power to the rail 240 for a predetermined amount of time after the reset generator 160 is actuated. In such embodiments, configuration occurs within such predetermined amount of time. The visual, auditory, vibration device described above may be activated during the predetermined amount of time available for configuration.

At any time, an RFID reader may be used to direct the RFID transceiver 154 to read any entries stored in the portion of the memory 152 reserved for monitoring data. In response, the RFID transceiver 154 reads and transmits such entries to the RFID reader so that such entries may be inspected to determine if the monitoring device 102, and therefore the package 100 to which such device is affixed, was subjected to conditions outside of those specified by the configuration parameters previously supplied to the monitoring device 102.

A monitoring device for detecting that an object has been subjected to a particular condition in accordance with the above may comprise a carrier disposed on the object, a processor disposed on the carrier, a sensor disposed on the carrier, and a configuration circuit. The sensor may be adapted to detect when the object is subjected to at least a first magnitude of the particular condition. The configuration circuit may specify a configuration parameter, wherein the configuration parameter includes a second magnitude of the particular condition, wherein the second magnitude is greater than the first magnitude. The processor may remain in an inactive state if the object is subjected to a magnitude of the particular condition less than the second magnitude, the sensor may generate a signal in response to detection of the object being subjected to a third magnitude of the particular condition, and in response to the signal the processor may enter an active state to develop an indication of third magnitude of the particular condition, wherein the third magnitude is greater than or equal to the second magnitude.

The processor of such a monitoring device processor may return to the inactive state after the indication has been developed, and the processor may remain in the inactive state until the sensor detects that the object is subjected to a fourth magnitude of the particular condition, wherein the fourth magnitude is greater the third magnitude.

Such monitoring device may comprise a further sensor that may be configured to sense a further condition to which the object may be subjected, and the processor periodically may poll the further sensor to determine if the object has been subjected to the further condition.

The carrier of the monitoring device may comprise a first surface and a second surface opposite the first surface, the processor and the sensor may be disposed on the first surface, and the second surface may be affixed to the object. The monitoring device may further comprise conductive traces coupled to the processor and the sensor, wherein the conductive traces may be printed on the first surface using one or more of inkjet printing, screen printing, lithographic printing, intaglio printing, gravure printing and flexographic printing.

The configuration circuit of the monitoring device may include an RFID transceiver, and the configuration parameter may be transmitted to the RFID transceiver. The configuration circuit may include two conductive traces associated with the configuration parameter, wherein coupling the two conductive traces specifies the second magnitude. The monitoring device may include a further carrier, wherein the two conductive traces may be disposed between the carrier and the further carrier, and the further carrier may include an aperture through which the two conductive traces may be coupled. The further carrier may include a further aperture and two further conductive traces that may be coupled through the further aperture, wherein coupling the two further conductive traces may specify a further configuration parameter.

The configuration circuit of the monitoring device may include two conductive traces that may be decoupled, and decoupling the two conductive traces may specify the second magnitude. The monitoring device may include a further carrier having a removable tab, wherein removing the removable tab decouples the two conductive traces. In addition, the further carrier may include a further removable tab, wherein removing the further removable tab specifies a further configuration parameter. The removable tab(s) may include a surface having a conductive portion and the conductive portion couples the two conductive traces. Removing the tab of the monitoring device may generate a reset signal to the processor.

In some cases, the processor of the monitoring device may configure the sensors in accordance with the configuration parameter.

The monitoring device may also include a reset signal generator to generate a reset signal that actuates the monitoring device. The reset signal generator may include two conductive traces that may be coupled, wherein the reset signal is generated when the two conductive traces are coupled. Alternately, the reset signal generator may include two conductive traces that may be decoupled, wherein the reset signal is generated when the two conductive traces are decoupled.

The carrier of the monitoring device may include a switch, a memory, and one or more removable tabs, wherein actuation of the switch causes the processor to record the tabs that have been removed. In response to actuation of the switch, the processor may record in the memory a plurality of configuration parameters determined by the removed tabs. In some cases, if none of the removable tabs have been removed, the processor, in response to actuation of the switch, may record in the memory predefined configuration parameters.

INDUSTRIAL APPLICABILITY

It should be apparent that the various embodiments of circuits to monitor conditions, configure the monitoring device 102 and generate the reset signal described hereinabove may be combined into any monitoring device. For example, an embodiment of the monitoring device 102 may use the reset signal generator shown in FIGS. 7A and 7B with the configuration tabs and circuits shown in FIGS. 8A, 8B, and 8C. As another example, an embodiment of the monitoring device 102 may use configuration tabs and circuits shown in FIGS. 8A, 8B, and 8C to configure a first set of parameters and the windows and circuits shown in FIGS. 9A and 9B. Further, such embodiment may also include reset generation shown in FIGS. 6A, 6B, and 6C. Other combinations will be apparent to those who have skill in the art. Other monitoring devices may include various combinations of one or more elements of the embodiments disclosed herein as appropriate in accordance with the intended use of the monitoring device.

The use of the terms "a" and "an" and "the" and similar references in the context of describing the embodiments herein are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

What is claimed is:

1. A monitoring device for detecting that an object has been subjected to a particular condition, comprising:
   a carrier disposed on the object;
   a processor disposed on the carrier;
   a sensor disposed on the carrier, wherein the sensor is adapted to detect when the object is subjected to at least a first magnitude of the particular condition;
   a configuration circuit for specifying a configuration parameter, wherein the configuration parameter includes a second magnitude of the particular condition, wherein the second magnitude is greater than the first magnitude, wherein the configuration circuit includes two conductive traces associated with the configuration parameter, wherein coupling the two conductive traces specifies the second magnitude;
   wherein the two conductive traces are disposed between the carrier and a further carrier, and the coupling occurs through an aperture of the further carrier and wherein the processor remains in an inactive state if the object is subjected to a magnitude of the particular condition less than the second magnitude, the sensor generates a signal in response to detection of the object being subjected to a third magnitude of the particular condition, and in response to the signal the processor enters an active state to develop an indication of third magnitude of the particular condition, wherein the third magnitude is greater than or equal to the second magnitude.

2. The monitoring device of claim 1, wherein the further carrier includes a further aperture and two further conductive traces; wherein the coupling of the two further conductive traces occurs through the further aperture, wherein the coupling of the two further conductive traces specifies a further configuration parameter.

3. A monitoring device for detecting that an object has been subjected to a particular condition, comprising:
   a carrier disposed on the object;
   a processor disposed on the carrier;
   a sensor disposed on the carrier, wherein the sensor is adapted to detect when the object is subjected to at least a first magnitude of the particular condition;
   a configuration circuit for specifying a configuration parameter, wherein the configuration parameter includes a second magnitude of the particular condition, wherein the second magnitude is greater than the first magnitude, wherein the configuration circuit includes two conductive traces that may be decoupled, and decoupling the two conductive traces specifies the second magnitude, wherein the monitoring device includes a further carrier having a removable tab, wherein removing the removable tab decouples the two conductive traces; and
   wherein the processor remains in an inactive state if the object is subjected to a magnitude of the particular condition less than the second magnitude, the sensor generates a signal in response to detection of the object being subjected to a third magnitude of the particular condition, and in response to the signal the processor enters an active state to develop an indication of third magnitude of the particular condition, wherein the third magnitude is greater than or equal to the second magnitude.

4. The monitoring device of claim 3, wherein the further carrier includes a further removable tab, wherein removing the further removable tab specifies a further configuration parameter.

5. The monitoring device of claim 3, wherein the removable tab includes a surface having a conductive portion and the conductive portion couples the two conductive traces.

6. The monitoring device of claim 3, wherein removing the removable tab generates a reset signal to the processor.

7. The monitoring device of claim 1, further including a reset signal generator to generate a reset signal that actuates the monitoring device, and wherein the reset signal is generated when the two conductive traces are coupled.

8. The monitoring device of claim 1, further including a reset signal generator to generate a reset signal that actuates the monitoring device, wherein the reset signal is generated when the two conductive traces are decoupled.

9. The monitoring device of claim 1, wherein the carrier includes a switch, a memory, and one or more removable tabs, wherein actuation of the switch causes the processor to record the tabs that have been removed.

10. The monitoring device of claim 9, wherein in response to actuation of the switch, the processor records in the memory a plurality of configuration parameters associated determined by the removed tabs.

11. The monitoring device of claim 9, wherein in response to actuation of the switch, the processor records in the memory predefined configuration parameters when none of the removable tabs have been removed.

12. A method of detecting that an object has been subjected to a particular condition, comprising:

detecting when the object is subjected to at least a first magnitude of the particular condition;

specifying a configuration parameter, wherein the configuration parameter includes a second magnitude of the particular condition, wherein the second magnitude is greater than the first magnitude, wherein specifying the configuration parameter comprises a step of coupling two conductive traces of an electronic circuit;

wherein the step of coupling the two conductive traces includes the step of accessing the two coupling traces through an aperture in a carrier;

generating a signal in response to detection of the object being subjected to a third magnitude of the particular object;

operating a processor in an inactive state if the object is subjected to a magnitude of the particular condition less than the second magnitude; and operating the processor in an active state to develop an indication of the third magnitude of the particular condition, wherein the third magnitude is greater than or equal to the second magnitude.

13. The method of claim 12, wherein the step of specifying the configuration parameter includes the step of decoupling the two conductive traces of an electronic circuit.

14. The method of claim 13, wherein the step of decoupling the two conductive traces includes a step of removing a removable tab from the carrier, wherein removing the removable tab is sufficient to decouples the two conductive traces.

* * * * *